United States Patent
Dominguez et al.

(10) Patent No.: US 7,400,766 B1
(45) Date of Patent: Jul. 15, 2008

(54) IMAGE EDGE EXTRACTION VIA FUZZY REASONING

(75) Inventors: Jesus A. Dominguez, Orlando, FL (US); Steve Klinko, Titusville, FL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 760 days.

(21) Appl. No.: 10/783,295

(22) Filed: Feb. 19, 2004

(51) Int. Cl.
G06K 9/34 (2006.01)
G06K 9/56 (2006.01)
G06K 9/40 (2006.01)
H04N 1/40 (2006.01)
H04N 1/38 (2006.01)

(52) U.S. Cl. .................. 382/173; 382/205; 382/266; 358/462; 358/463; 358/464; 358/465

(58) Field of Classification Search .......... 382/173, 382/174, 175, 176, 205, 266; 358/462, 463, 358/464, 465, 466
See application file for complete search history.

(56) References Cited

U.S. PATENT DOCUMENTS

| 5,179,599 | A |  | 1/1993 | Formanek |
|---|---|---|---|---|
| 5,377,020 | A |  | 12/1994 | Smitt |
| 5,434,927 | A |  | 7/1995 | Brady et al. |
| 5,442,462 | A |  | 8/1995 | Guissin |
| 5,481,620 | A |  | 1/1996 | Vaidyanathan |
| 5,590,220 | A |  | 12/1996 | Takahashi |
| 5,651,077 | A |  | 7/1997 | Dong et al. |
| 5,754,709 | A |  | 5/1998 | Moriya et al. |
| 5,761,326 | A |  | 6/1998 | Brady et al. |
| 5,799,111 | A |  | 8/1998 | Guissin |
| 5,870,495 | A |  | 2/1999 | Mancuso et al. |
| 6,094,508 | A |  | 7/2000 | Acharya et al. |
| 6,285,801 | B1 |  | 9/2001 | Mancuso et al. |
| 6,347,153 | B1 |  | 2/2002 | Triplett et al. |
| 6,424,736 | B1 | * | 7/2002 | Meitzler et al. ............. 382/155 |
| 6,665,439 | B1 | * | 12/2003 | Takahashi .................. 382/199 |

FOREIGN PATENT DOCUMENTS

JP    08329252    * 12/1996    ..................... 9/20

OTHER PUBLICATIONS

Khamy, S.—"A fuzzy gradient-adaptive lossy predictive coding technique"—IEEE—Mar. 2003.*

(Continued)

Primary Examiner—Jingge Wu
Assistant Examiner—Bernard Krasnic
(74) Attorney, Agent, or Firm—Randall M. Heald; William A. Blake

(57) ABSTRACT

A computer-based technique for detecting edges in gray level digital images employs fuzzy reasoning to analyze whether each pixel in an image is likely on an edge. The image is analyzed on a pixel-by-pixel basis by analyzing gradient levels of pixels in a square window surrounding the pixel being analyzed. An edge path passing through the pixel having the greatest intensity gradient is used as input to a fuzzy membership function, which employs fuzzy singletons and inference rules to assigns a new gray level value to the pixel that is related to the pixel's edginess degree.

16 Claims, 7 Drawing Sheets

OTHER PUBLICATIONS

Dominguez, Jesus, et al., Implementation of a General Real-Time Visual Anomaly Detection System via Fuzzy Reasoning and Neural-Generic Network.

The 10th IEEE Conference on Fuzzy Systems, The University of Melbourne, Australia, Dec. 2-5, 2001.

Chang, Yan et al., Comparison of Five Conditional Probabilities in 2-level Image Thresholding Based on Baysian Formulation, The University of Sydney, Australia, pp. 1-6.

Papamarkos, Nikos, A Technique for Fuzzy Document Binarization, Dept. of Electrical and Computer Engineering, Democritus University of Thrace, 67100 Xanthi, Greece, p. 152-156.

Huang, Liang-Kai, et al., Image Thresholding By Minimizing the Measures of Fuzziness, Pattern Recognition, vol. 28, No. 1, pp. 41-51 (1995).

Otsu, N., A Threshold Selection Method From Gray-Level Histograms, IEEE Transactions on Systems, Man, and Cybennetics, vol. 9, No. 1, pp. 62-66 (1979).

Dominguez, Jesus, et al., Detecting Edges in Images by Use of Fuzzy REasoning, NASA Tech Briefs, Nov. 2003.

* cited by examiner

IMAGE EDGE EXTRACTION VIA FUZZY REASONING

ORIGIN OF THE INVENTION

The invention described herein was made in the performance of work under a NASA contract and is subject to the provisions of Public Law 96-517 (35 U.S.C. § 202) in which the contractor has elected not to retain title.

CROSS REFERENCE TO RELATED APPLICATIONS

This application is related to an application entitled Optimal Binarization of Gray-Scaled Images Via Fuzzy Reasoning, which is commonly owned with the subject application and is to be filed under Ser. No. 10/779/551.

BACKGROUND OF THE INVENTION

1. Field of the Invention

The present invention relates in general to a method and system for detecting edges in digital images in which fuzzy reasoning is employed to determine the degree to which each pixel in an image represents an edge.

2. Description of the Background Art

Accurate detection in images of edges, which contain the most important information, is vital to performing advanced image processing and analysis. Unfortunately, images of real scenes frequently contain data that is ambiguous and incomplete. As a result, the problem of determining what is and what is not an edge is confounded by the fact that edges are very often partially hidden or distorted by various effects such as uneven lighting and image acquisition noise. Furthermore, images frequently contain data with edge-like characteristics, but a confident classification of this data can be best solved when high-level constraints are imposed on the interpretation of an image.

Most known edge detector techniques require the selection of parameters (e.g. thresholds in gradient edge detectors, thresholds in Laplacian edge detectors, and s in Laplacian of Gaussian edge detectors) when no information about the images is known in advance. Edge detection based on mathematical models can only detect specific kinds of noticeable edges. For example, an optimal mathematical-model-based step edge detector can be ineffective for ramp edges. Moreover, the parameters in some of the mathematical models are difficult to determine when little information about the image is known.

Human beings, on the other hand, are able to make some sense of even unfamiliar objects, which necessarily have an imperfect high-level representation. To perceive unfamiliar objects, or to perceive familiar objects with imperfect images, it appears that humans apply heuristic algorithms to understand such images. Although these algorithms may be "implemented" in the wetware of the human vision system, it is feasible to believe that it is possible to characterize an equivalent process systematically. One would therefore suspect that a system that employs human like heuristic algorithms would be particularly suited for image edge detection considering the indeterminate nature of edge detection data. Such a system may well be found to out perform other, mathematical based edge detection techniques.

SUMMARY OF THE INVENTION

The present invention provides such a heuristic algorithm based technique for image edge detection that has in fact been shown to outperform previous mathematical based edge detection techniques. More particularly, the technique employs fuzzy reasoning, which is a suitable framework for expressing heuristic processes applied to incomplete and imperfect image data. With fuzzy reasoning, the edge detection technique is completely adaptive with no need for selecting parameters. The use of fuzzy reasoning with the power to model and respond usefully to approximate situations is ideally suited to edge detection because the nature of the data is indeterminate at a low-level stage of processing.

In the specific method of the present invention, a multiple pixel digital image is analyzed for edges on a pixel-by-pixel basis. That is, each pixel in the image is analyzed to determine the degree to which it represents a part of an edge in the image. The analysis relies on the fact that if a pixel is on an edge, then that edge will extend in some direction away from the pixel and pixels on either side of the edge will likely have gray values that differ substantially from one another. For example, if predominantly dark, low valued pixels are on one side of the edge, predominantly light or high valued pixels will likely be on the opposite side of the edge.

With the foregoing in mind, the method of the present invention begins edge analysis of a pixel in the image by identifying an edge path running through the pixel and determining the intensity gradient on either side of the edge. To do this, a square n×n pixel window (n being an odd number greater or equal to 3) is preferably used with the pixel to be analyzed being located at the center of the window. There are four possible edge paths through the center pixel: horizontal, vertical and two 45 degree diagonals. Each one of these edge paths splits the n×n pixel window into two regions, each holding an equal number of pixels.

In the preferred embodiment, the average change of gray levels across each one of the four edge paths is computed and the edge path with the greatest change of gray levels is chosen to be used as a dimensionless input to a fuzzy membership function. The linguistic values (or labels) used for the average change of gray levels are those one heuristically might use: Small, Medium and Large. The output variable is the degree of edginess that the central pixel in the window has based on the intensity gradient value and is preferably evaluated using a known inference method referred to as the Truth Value Flow Inference (TVFI) method that uses singletons instead of fuzzy sets as used in the widely-used Mandini method. The linguistic variables (or labels) of the output value are also those one heuristically might use: Edge, Mild edge and No Edge. Simple inference rules are then used to express the dependency between the input and output values. If the grayness change is small, then the central pixel is No Edge; if the grayness change is Medium, then the central pixel is a Mild Edge; and, if the grayness change is Large, then the central pixel is Edge. A value between 0.0 and 1.0 is thus assigned to each of these three characteristics, which values represent the degree to which the pixel is an Edge, a Mild Edge or No Edge.

The final step of the method is defuzzification where the three characteristic output values for the selected edge path are combined using an averaging method to determine the crisp output value for the central pixel. Preferably, the averaging method is either an averaging union of truncated output singletons (TVFI method) or a centroid averaging process (Mandini method). The final output value of the central pixel is generated by multiplying the full grayness level and its respective edginess degree, which results in assignment of a new gray level value to the pixel that is directly proportional to the pixel's edginess degree. The foregoing process is then repeated for all other possible windows until each pixel in the image has been characterized based on edginess.

BRIEF DESCRIPTION OF THE DRAWINGS

The features and advantages of the present invention will become apparent from the following detailed description of a preferred embodiment thereof, taken in conjunction with the accompanying drawings, in which.

DETAILED DESCRIPTION OF THE PREFERRED EMBODIMENT

Figure 1:
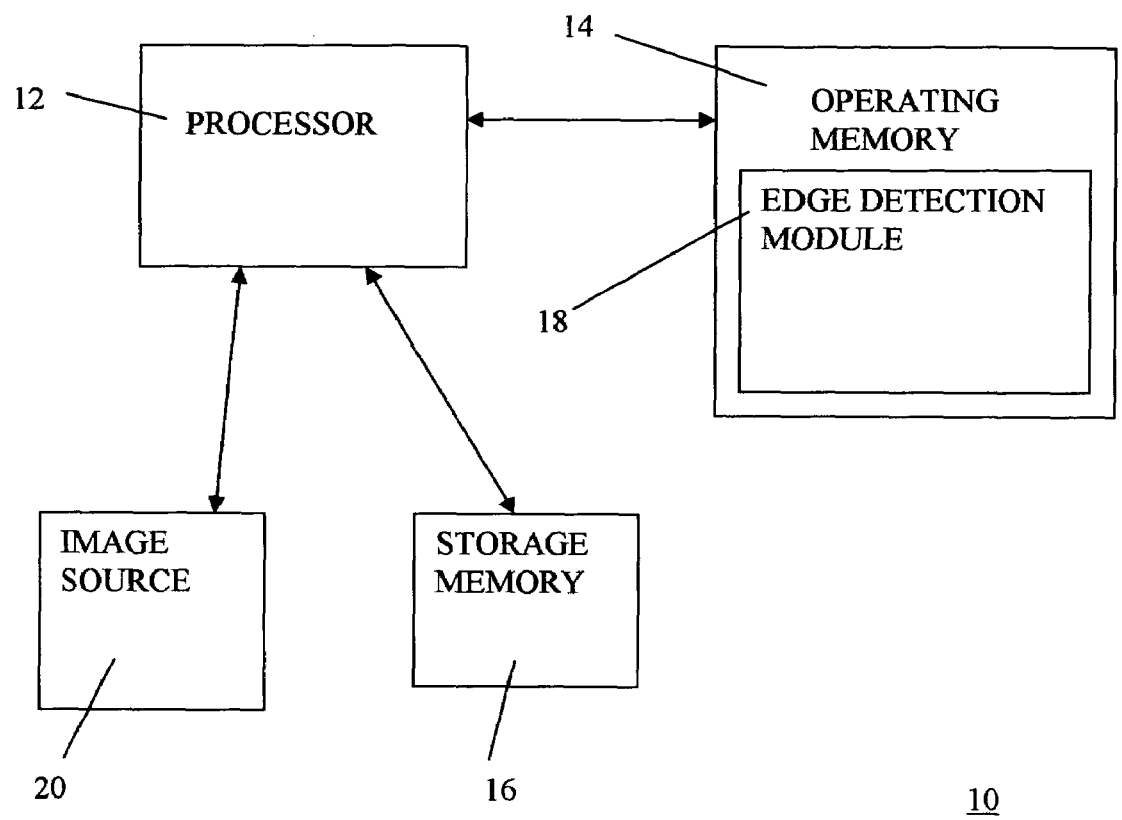
FIG. 1 is a block diagram of a computer system that can be employed for detecting edges in digital images using a fuzzy reasoning based algorithm in accordance with the preferred embodiment of the present invention.

With reference to FIG. 1, a computer system 10 is illustrated which includes a processor 12 that is interfaced to an operating memory 14 and a storage memory 16, as is conventional. Loaded into the operating memory 14 is an edge detection software application or module 18 that is designed to detect edges in multiple bit digital images using fuzzy reasoning in accordance with a preferred embodiment of the present invention. The computer system 10 can be implemented using any conventional PC, for example, but other computer systems can be employed as well.

Multiple pixel digital images to be analyzed for edges are either retrieved from the storage memory 16 or from an external image source 20 and are fed into the edge detection application 18 for analysis with an edge detection algorithm. In the specific method of the present invention, a multiple pixel digital image is analyzed for edges on a pixel-by-pixel basis. That is, each pixel in the image is analyzed to determine the degree to which the pixel likely represents a part of an edge in the image. The analysis relies on the fact that if a pixel is on an edge, then that edge will extend in some direction away from the pixel and pixels on either side of the edge will likely have gray values that differ substantially from one another. For example, if predominantly dark, low valued pixels are on one side of the edge, predominantly light or high valued pixels will likely be on the opposite side of the edge.

Figure 2:
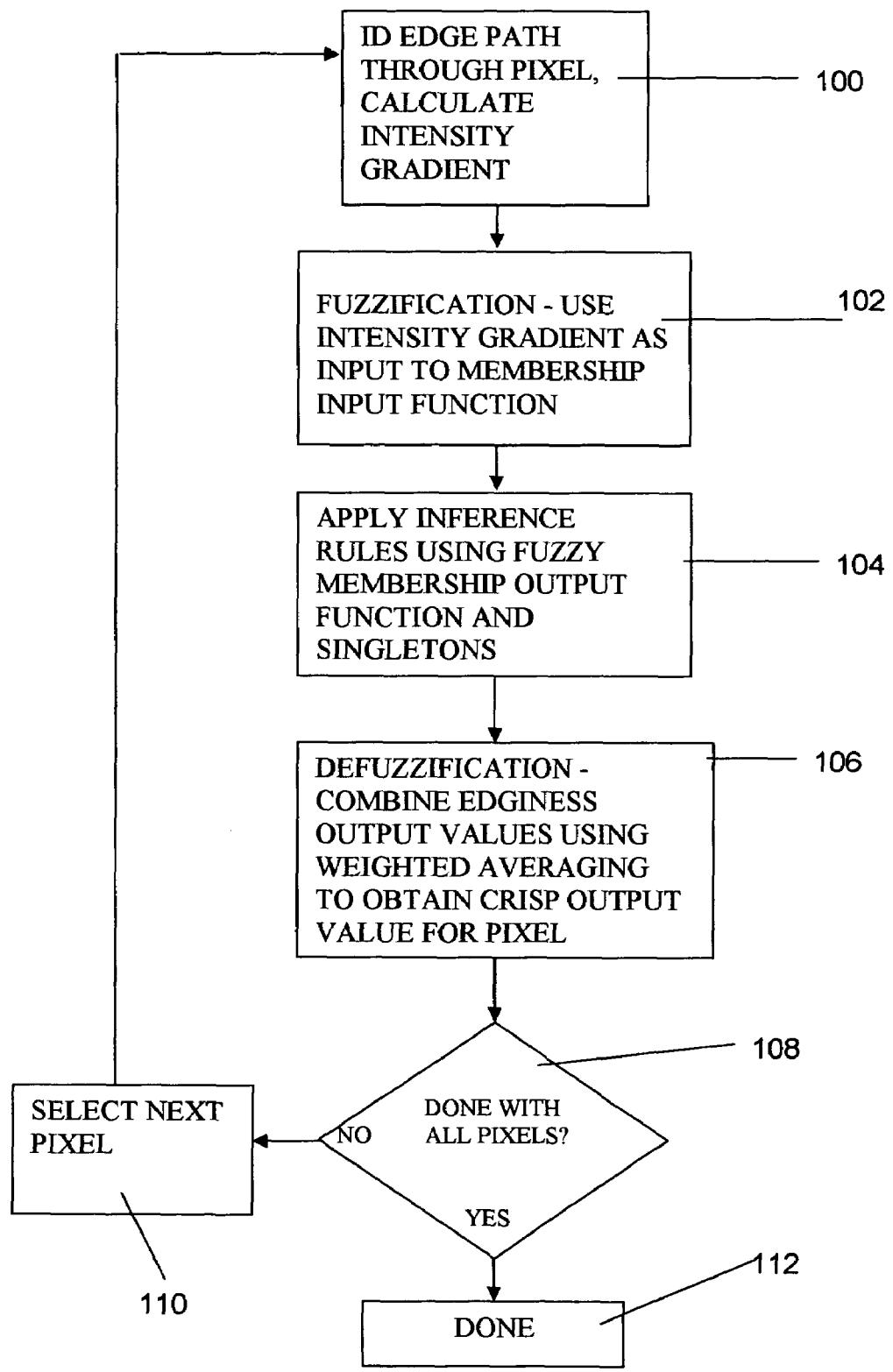
FIG. 2 is a flowchart showing the steps carried out by the edge detection algorithm of the preferred embodiment.
Figure 3:
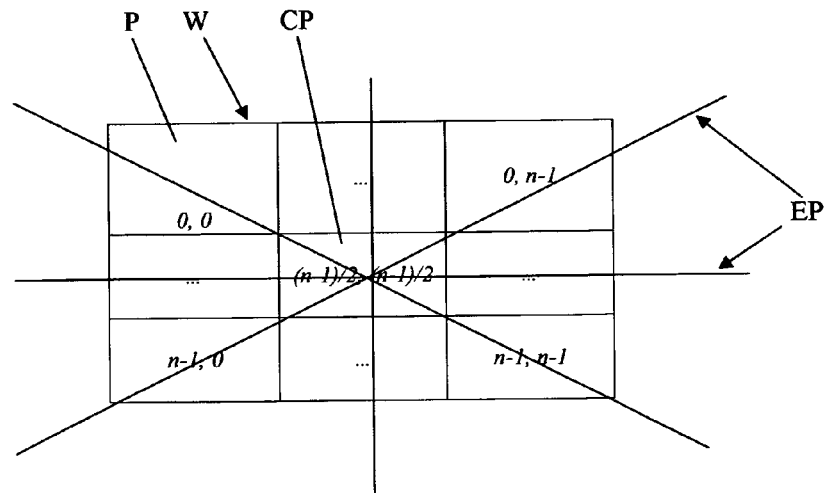
FIG. 3 is a schematic illustration of a 3×3 pixel window that is employed in the edge detection algorithm of the preferred embodiment to identify an edge passing through a pixel in an image having a maximum intensity gradient from one side of the edge to the opposite side of the edge.

With the foregoing in mind and with reference to the flowchart of FIG. 2, the algorithm of the present invention begins edge analysis of a pixel in the image at step 100 by identifying an edge path running through the pixel and calculating a pixel intensity gradient on either side of the edge path. To do this, a square n×n pixel window (n being an odd number greater or equal to 3) is used with the pixel to be analyzed being located at the center of the window. FIG. 3 illustrates such a 3×3 pixel window W with a plurality of pixels P and a center pixel CP. The n×n pixels P are arbitrary labeled (i, j) where i is the window's row number (i=0, 1, 2, ,, n−1) and j is the window's column number (j=0, 1, 2, ,, n−1). Since n is an odd number, the center pixel CP is located at x, y coordinates i=(n−1)/2 and j=(n−1)/2.

It should be noted that the use of the window W means that some pixels along the borders of the image will not be analyzed since they cannot be surrounded by a window. However, this is of little consequence since the outside edges of the image are not typically of interest in an edge detection analysis. For example, a 3×3 window would leave a 1-pixel image margin without edge grade evaluation while a 5×5 window would generate a 2-pixel margin.

As also illustrated in FIG. 3, there are four possible edge paths EP through the center pixel: horizontal, vertical and two 45 degree diagonals. Each one of these edge paths splits the n×n pixel window W into two regions, each holding an equal number of pixels. In the preferred embodiment, the average change or gradient of gray levels across each one of the four edge paths is then computed and the edge path with the greatest change of gray levels $S_{max}$ is chosen to be used as a dimensionless input to a fuzzy membership function. If an 8 bit gray scale is employed a gray gradient value between 0 and 255 is generated; $S_{max}$ will be a dimensionless number between 0 and 1 as it is generated by dividing the gray gradient value by 255, the highest possible gray gradient value. It should be noted that while it is preferred to compare the intensity gradients of all four possible edge paths, any lesser number of the paths could be analyzed if desired, though this would likely diminish the accuracy of the edge detection process.

Figure 4:
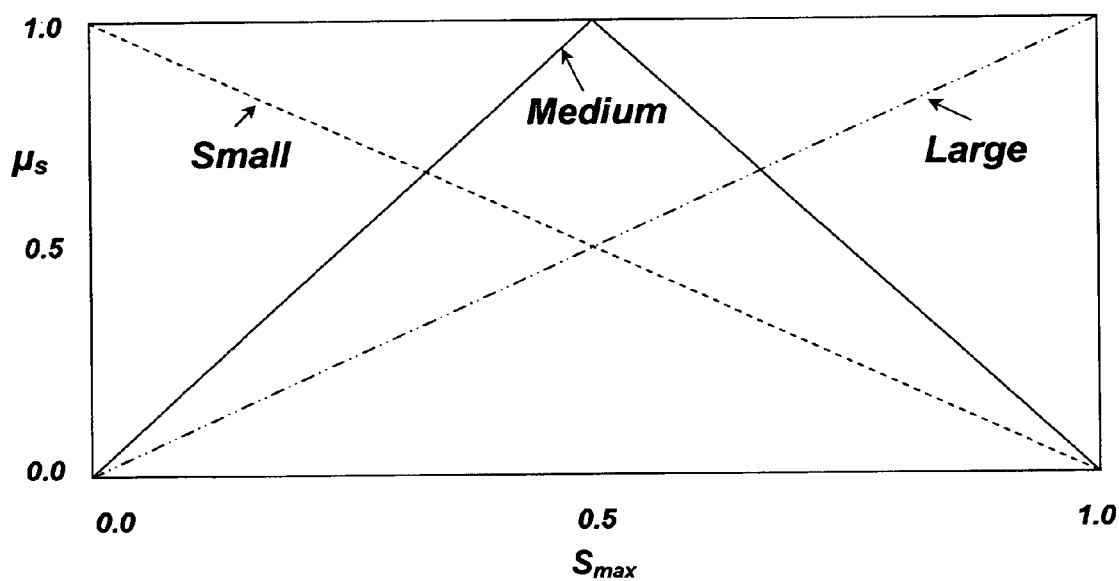
FIG. 4 is graph illustrating an input fuzzy membership function employed in the edge detection algorithm of the preferred embodiment.

The next step 102 of the process is called fuzzification. This step involves entry of $S_{max}$ into a fuzzy membership function as illustrated in FIG. 4, which shows the input membership function for a plurality of input linguistic values or characteristics that are associated with the dimensionless gray level gradient value, $S_{max}$. In the preferred embodiment, the input linguistic values (or labels) used for the average change of gray levels are those one heuristically might use: Small, Medium and Large. Thus, the graph of FIG. 4 shows the pixel gradient change $S_{max}$ as a function of the degree, from 0.0 to 1.0, that the magnitude of $S_{max}$ is characterized as Small, Medium and Large. The membership function therefore converts the single input into three input values, one for each label.

Figure 5:
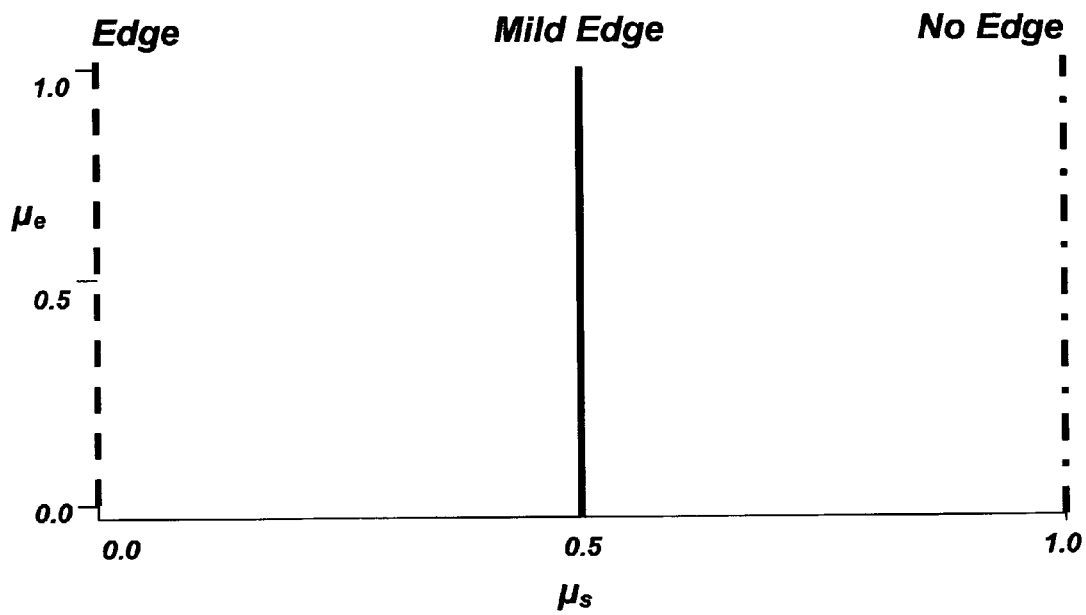
FIG. 5 is a graph illustrating an output fuzzy membership function that is employed in the edge detection algorithm of the preferred embodiment.

The next step 104 implemented by the edge detection algorithm is referred to as rule evaluation in which each of the input values generated by the input membership function is applied to an output membership function. FIG. 5 illustrates the output membership function in which inference rules are applied to the values obtained from the input membership function. The output variable $\mu_e$ is the degree of edginess that the central pixel in the window has based on the intensity gradient value and is preferably evaluated using a known inference method referred to as the Truth Value Flow Inference (TVFI) method that use singletons. Other more computation intensive inference methods, such as the well-known Mandani inference method, can be used, but the TVFI method is preferred for its simplicity that leads to a much less CPU demanding approach. The linguistic variables (or labels) of the output value are also those one heuristically might use: Edge, Mild Edge and No Edge. Simple inference rules are then used to express the dependency between the input and output values. Every input value goes through the rules to lead to its respective output value holding three weight values for each one of the output adjectives (Edge, Mild Edge and No Edge). It should be noted that the sum of these weight values does not have to equal 1.0 as fuzzy reasoning is not the same as probability.

The inference rules are as follows:

1) If the grayness change is Small, then the central pixel is No Edge;
2) if the grayness change is Medium, then the central pixel is Mild Edge; and,
3) if the grayness change is Large, then the central pixel is Edge.

Thus, for each pixel, the inference rules will result in three characteristic output values, each between 0.0 and 1.0, that represent the degree to which the pixel is No Edge, Mild Edge and Edge, respectively.

Figure 6:
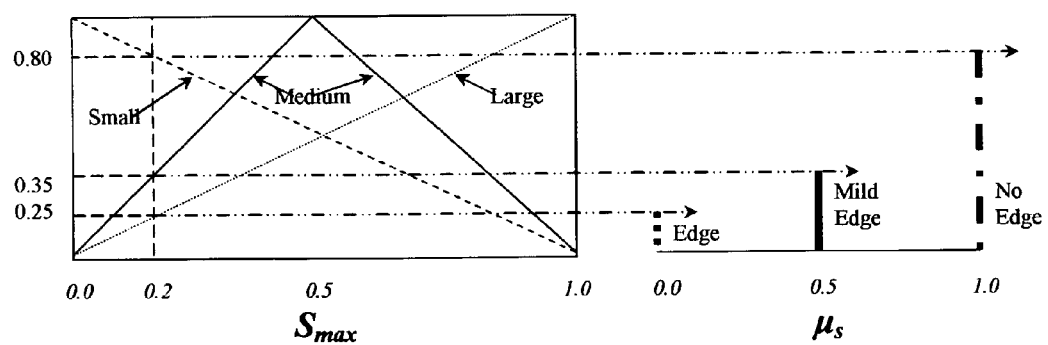
FIG. 6 is a graph illustrating how an input value is employed by the input membership function to determine the singleton values (TVFI method) on the respective output membership value.

The graph of FIG. 6 illustrates the application of the inference rules on both the input and output membership functions that yield the final set of truncated singleton values. In the example of FIG. 6, the input value 0.2 leads to input adjective weight values of 0.25, 0.35, and 0.8 for Large, Medium and Small respectively; these adjective weight values and the set of rules yield the truncated output singleton values 0.25, 0.35, and 0.8 for the adjectives Edge, Mild and No Edge respectively.

Figure 7:
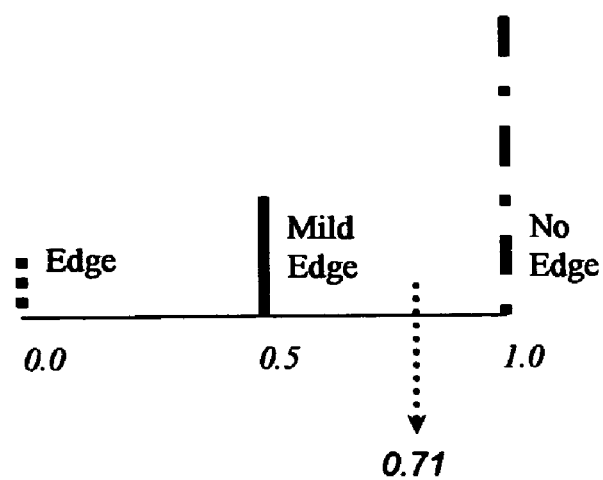
FIG. 7 is a graph illustrating how the final crisp output value is generated based on the singleton output values shown in FIG. 6.

Once the truncated singleton values have been determined, the final step 106 of the method is defuzzification where the three characteristic output values for the selected edge path are combined using an averaging union of singletons (TVFI method) or a centroid averaging (Mandini method) to determine a crisp output value for the central pixel. More particularly, the defuzzification process takes the union of the truncated singleton values illustrated in FIG. 6, and then takes their weighted average to generate a crisp output value of 0.71 as shown in FIG. 7. In contrast with the Mandini method, the TVFI method does not need to determine the centroid of the resultant fuzzy set. The final output value of the central pixel is generated by multiplying the full grayness level (255 for 8-bit gray-scaled images) and its respective edginess degree (a number between 0.0 and 1.0). This results in assignment of a new gray level value to the pixel that is directly proportional to the pixels' edginess degree. The algorithm then queries at step 108 whether all pixel windows have been evaluated. If not, the algorithm selects the next pixel at step 110 and returns to step 100 to repeat the foregoing process until each pixel in the image has been characterized based on its degree of edginess. Once all pixels have been characterized, the application is done at step 112.

Figure 8:
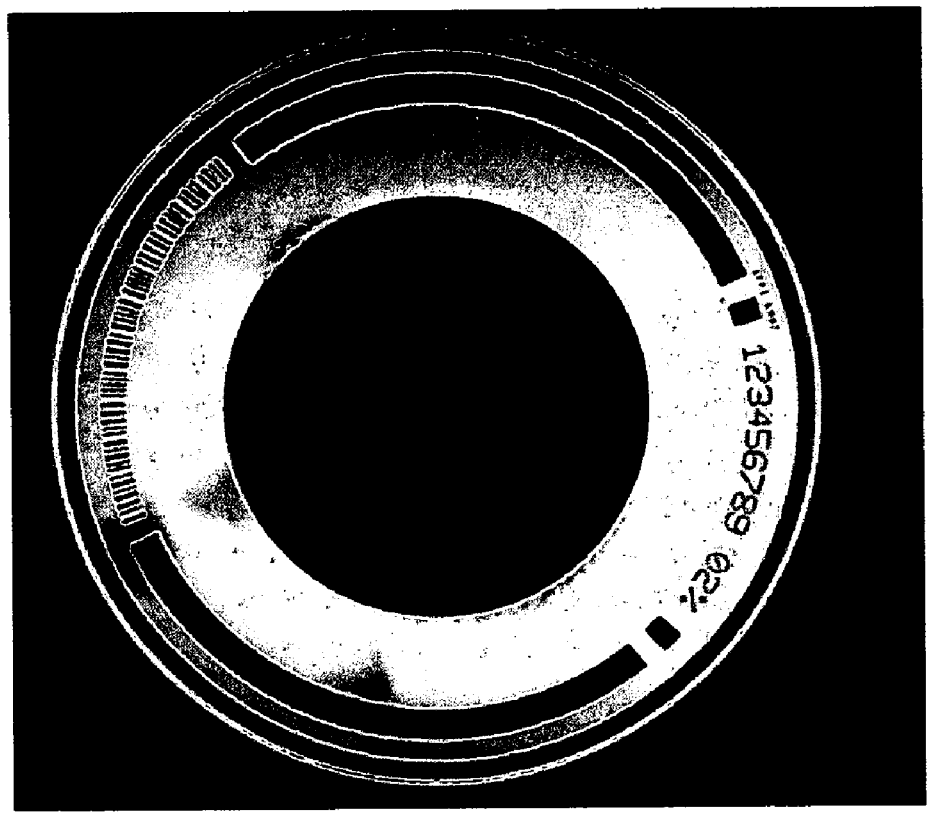
FIG. 8 is a gray-scale image to be analyzed for edges in accordance with the preferred embodiment.
Figure 9:
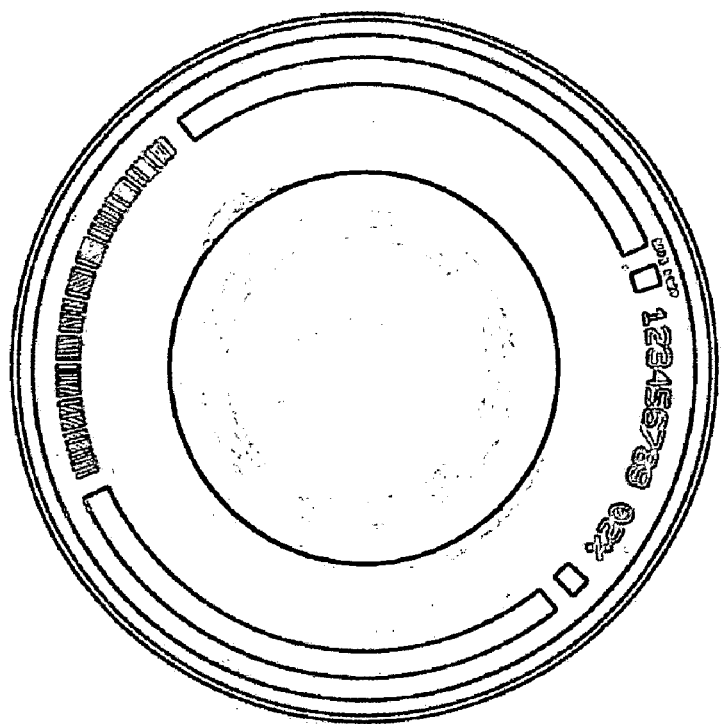
FIG. 9 is an output from a first prior art edge detector algorithm of the image of FIG. 8.
Figure 10:
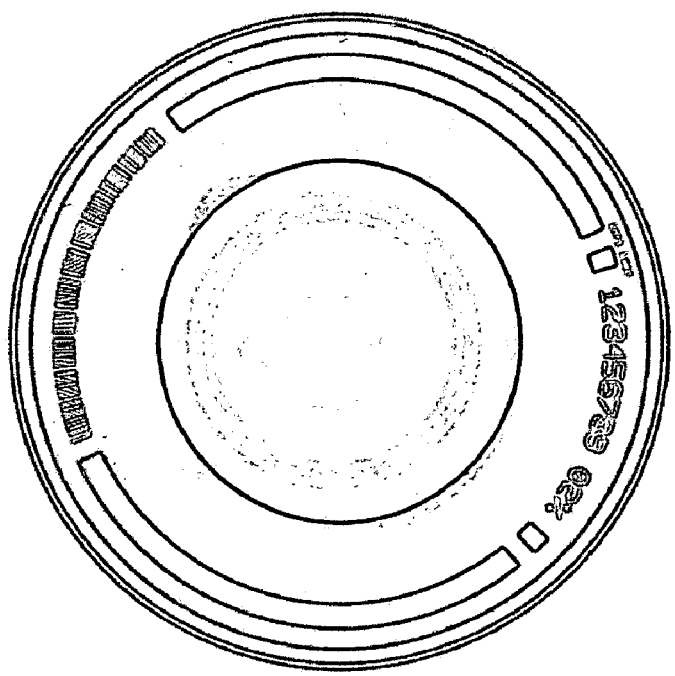
FIG. 10 is an output from a second prior art edge detector algorithm of the image of FIG. 8.
Figure 11:
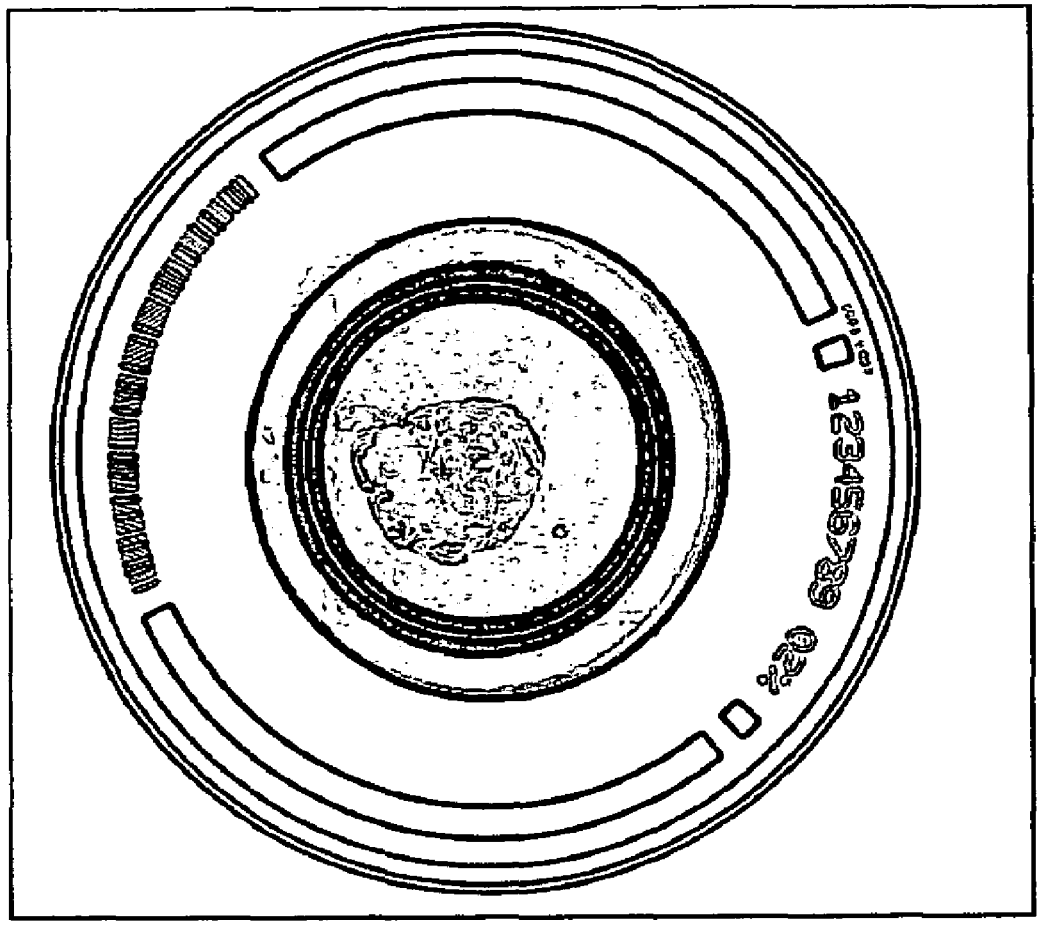
FIG. 11 is an output from the edge detector algorithm of the preferred embodiment of the present invention.

To test the effectiveness of the subject edge detection technique, the image of a compact disc (CD) shown in FIG. 8 was used as input and analyzed using two prior art, mathematical based edge detection algorithms and the algorithm of the subject invention. FIGS. 9 and 10 show edge detection results generated by the prior art algorithms, known as Sobel and Prewit, respectively, while FIG. 11 shows the edge detection generated by the fuzzy reasoning algorithm of the subject invention. As the images show, the edge detection performance based on fuzzy reasoning widely supersedes those based on the prior art mathematical algorithms. For example, tiny edges are not detected by the prior art algorithms. There is a dark spot with tiny edges close to the center of the CD, and the fuzzy reasoning based algorithm of the subject invention clearly both detects and identifies it, while the prior art techniques fail to even detect it. Numbers and marks on the CD are also much clearer using the subject fuzzy reasoning edge detector.

Although the invention has been disclosed in terms of a preferred embodiment, and variations thereon, it will be understood that numerous other modifications and variations could be made thereto without departing from the scope of the invention as set forth in the following claims.

What is claimed is:

1. A computer-based method for detecting one or more edges in a multiple pixel digital image comprising the steps of:
    loading a multiple pixel digital gray scale image to be analyzed from an external source of images into an operating memory of a computer;
    analyzing said image for edges with an image edge detection application run by said computer, said application comprising the steps of:
    1) selecting a pixel in said image to be analyzed;
    2) identifying a plurality of potential edge paths which pass through said selected pixel;
    3) calculating an average pixel intensity gradient value for each of said edge paths by comparing a gray level intensity of pixels on one side of each of said edge paths to a gray level intensity of pixels on an opposite side of each of said edge paths;
    4) selecting the greatest of said average pixel intensity gradient values of said edge paths as an input to a single fuzzy membership function and generating with said function, a plurality of output values that are related to a degree to which said pixel represents an edge in said image;
    5) combining said plurality of output values using a weighted averaging analysis comprising an averaging union of truncated output singletons to assign a crisp edginess value to said pixel;
    6) assigning a new edginess based gray level value to said pixel by multiplying an original gray level value of said selected pixel by said crisp edginess value, said new edginess based gray level value being proportional to an edginess degree of said selected pixel; and
    7) repeating steps (1)-(6) for additional pixels in said image.

2. The computer-based method of claim 1, wherein four edge paths are identified that pass through said pixel.

3. The computer-based method of claim 1, wherein said average pixel intensity gradient value for each of said edge paths is calculated by:
    selecting an n×n pixel window, where n is an odd number greater than or equal to 3 and said pixel to be analyzed is located at a center of said window;
    calculating a first, average pixel intensity value of pixels in said window on a first side of said edge path;
    calculating a second, average pixel intensity value of pixels in said window on a second, opposite side of said edge path; and,
    calculating a difference between said first and second values to obtain said average pixel intensity gradient value.

4. The computer-based method of claim 1, wherein said step of generating a plurality of output values with said single membership function comprises:
- employing an input membership function to generate a plurality of input values relating said average pixel intensity gradient value to a plurality of degrees of intensity;
- applying a plurality of inference rules in an output membership function that relate the plurality of intensity degrees to a corresponding plurality of edginess degrees and thereby generate said plurality of output values.

5. The computer-based method of claim 4, wherein three of said input values, three of said inference rules and three of said output values are employed; said input values being small, medium and large; said output values being no edge, mild edge and edge; and said inference rules being if the average pixel intensity gradient value is small, the pixel is not an edge; if the average pixel intensity gradient value is medium, the pixel is a mild edge; and, if the average pixel intensity gradient value is large, the pixel is an edge.

6. A computer-based method for detecting one or more edges in a multiple pixel digital image comprising the steps of:
- loading a multiple pixel digital gray scale image to be analyzed from an external source of images into an operating memory of a computer;
- analyzing said image for edges with an image edge detection application run by said computer, said application comprising the steps of:
  1) selecting a pixel in said image to be analyzed;
  2) selecting an n×n pixel window, where n is an odd number greater than or equal to 3 and said window includes a center pixel, wherein said center pixel is said pixel to be analyzed;
  3) identifying a plurality of edge paths that run through said center pixel and divide said window into first and second groups of pixels;
  4) for each of said edge paths, calculating a first, average pixel intensity value of pixels in said first group and a second, average pixel intensity value of pixels in said second group; and, calculating a difference between said first and second values to obtain an average pixel intensity gradient value for each said edge path;
  5) selecting the greatest of said average pixel intensity gradient values as an input to a single fuzzy membership function to generate a plurality of input values relating said average pixel intensity gradient value to a plurality of degrees of intensity;
  6) applying a plurality of inference rules in an output membership function that relate the plurality of intensity degrees to a corresponding plurality of edginess degrees and generate a plurality of output values that are related to a degree to which said center pixel represents an edge in said image;
  7) combining said plurality of output values using a weighted averaging analysis comprising an averaging union of truncated output singletons to assign a crisp edginess value to said center pixel;
  8) assigning a new edginess based gray level value to said pixel by multiplying an original gray level value of said selected pixel by said crisp edginess value, said new edginess based gray level value being proportional to an edginess degree of said selected pixel; and,
  9) repeating steps (1)-(8) for additional pixels in said image.

7. The computer-based method of claim 6, wherein four edge paths are identified that pass through said pixel.

8. The computer-based method of claim 6, wherein three of said input values, three of said inference rules and three of said output values are employed; said input values being small, medium and large; said output values being no edge, mild edge and edge; and said inference rules being if the average pixel intensity gradient value is small, the pixel is not an edge; if the average pixel intensity gradient value is medium, the pixel is a mild edge; and, if the average pixel intensity gradient value is large, the pixel is an edge.

9. A computer system for detecting one or more edges in a multiple pixel digital image comprising:
- a processor;
- an operating memory interfaced to and readable by said processor;
- an external source of multiple pixel digital gray scale images to be analyzed for edges; and
- an image edge detection application embodied in said operating memory and executable by said processor for performing process steps for retrieving a multiple pixel gray scale digital image from said external source and detecting edges in said image, said process steps comprising the steps of:
  1) retrieving an image to be analyzed from said source of images;
  2) selecting a pixel in said image to be analyzed;
  3) identifying a plurality of edge paths which pass through said selected pixel;
  4) calculating an average pixel intensity gradient value for each of said edge paths by comparing a gray level intensity of pixels on one side of each of said edge paths to a gray level intensity of pixels on an opposite side of each of said edge paths;
  5) selecting the greatest of said average pixel intensity gradient values of said edge paths as an input to a single fuzzy membership function and generating with said function, a plurality of output values that are related to a degree to which said pixel represents an edge in said image;
  6) combining said plurality of output values using a weighted averaging analysis comprising an averaging union of truncated output singletons to assign a crisp edginess value to said pixel;
  7) assigning a new edginess based gray level value to said pixel by multiplying an original gray level value of said selected pixel by said crisp edginess value, said new edginess based gray level value being proportional to an edginess degree of said selected pixel; and,
  8) repeating steps (2)-(7) for additional pixels in said image.

10. The computer system of claim 9, wherein said application identifies four edge paths that pass through said pixel.

11. The computer system of claim 9, wherein said application calculates said average pixel intensity gradient value by:
- selecting an n×n pixel window, where n is an odd number greater than or equal to 3 and said pixel to be analyzed is located at a center of said window;
- calculating a first, average pixel intensity value of pixels in said window on a first side of said edge path;
- calculating a second, average pixel intensity value of pixels in said window on a second, opposite side of said edge path; and,
- calculating a difference between said first and second values to obtain said average pixel intensity gradient value.

12. The computer system of claim 9, wherein said application carries out said step of generating a plurality of output values with said single membership function by:

employing an input membership function to generate a plurality of input values relating said average pixel intensity gradient value to a plurality of degrees of intensity;

applying a plurality of inference rules in an output membership function that relate the plurality of intensity degrees to a corresponding plurality of edginess degrees and thereby generate said plurality of output values.

13. The computer-based method of claim 12, wherein three of said input values, three of said inference rules and three of said output values are employed; said input values being small, medium and large; said output values being no edge, mild edge and edge; and said inference rules being if the average pixel intensity gradient value is small, the pixel is not an edge; if the average pixel intensity gradient value is medium, the pixel is a mild edge; and, if the average pixel intensity gradient value is large, the pixel is an edge.

14. A computer system for detecting one or more edges in a multiple pixel digital image comprising:

a processor;

an operating memory interfaced to and readable by said processor;

an external source of multiple pixel digital gray scale images to be analyzed for edges; and, an image edge detection application embodied in said operating memory and executable by said processor for performing process steps for retrieving a multiple pixel gray scale digital image from said external source and detecting edges in said image, said process steps comprising the steps of:

1) retrieving an image to be analyzed from said source of images;
2) selecting a pixel in said image to be analyzed;
3) selecting an n×n pixel window, where n is an odd number greater than or equal to 3 and said window includes a center pixel, wherein said center pixel is said pixel to be analyzed;
4) identifying a plurality of edge paths that run through said center pixel and divide said window into first and second groups of pixels;
5) for each of said edge paths, calculating a first, average pixel intensity value of pixels in said first group and a second, average pixel intensity value of pixels in said second group; and, calculating a difference between said first and second values to obtain an average pixel intensity gradient value for each said edge path;
6) selecting the greatest of said average pixel intensity gradient values as an input to a single fuzzy membership function to generate a plurality of input values relating said average pixel intensity gradient value to a plurality of degrees of intensity;
7) applying a plurality of inference rules in an output membership function that relate the plurality of intensity degrees to a corresponding plurality of edginess degrees and generate a plurality of output values that are related to a degree to which said center pixel represents an edge in said image;
8) combining said plurality of output values using a weighted averaging analysis comprising an averaging union of truncated output singletons to assign a crisp edginess value to said center pixel;
9) assigning a new edginess based gray level value to said pixel by multiplying an original gray level value of said selected pixel by said crisp edginess value, said new edginess based gray level value being proportional to an edginess degree of said selected pixel; and,
10) repeating steps (2)-(9) for additional pixels in said image.

15. The computer system of claim 14, wherein said application identifies four edge paths that pass through said pixel.

16. The computer-based method of claim 14, wherein three of said input values, three of said inference rules and three of said output values are employed; said input values being small, medium and large; said output values being no edge, mild edge and edge; and said inference rules being if the average pixel intensity gradient value is small, the pixel is not an edge; if the average pixel intensity gradient value is medium, the pixel is a mild edge; and, if the average pixel intensity gradient value is large, the pixel is an edge.

* * * * *